United States Patent
Khojastepour et al.

(10) Patent No.: US 12,199,727 B2
(45) Date of Patent: Jan. 14, 2025

(54) MULTI-USER BEAM ALIGNMENT IN PRESENCE OF MULTI-PATH

(71) Applicant: NEC Laboratories America, Inc., Princeton, NJ (US)

(72) Inventors: Mohammad Khojastepour, Lawrenceville, NJ (US); Nariman Torkzaban, College Park, MD (US)

(73) Assignee: NEC Corporation, Tokyo (JP)

( * ) Notice: Subject to any disclaimer, the term of this patent is extended or adjusted under 35 U.S.C. 154(b) by 135 days.

(21) Appl. No.: 17/993,341

(22) Filed: Nov. 23, 2022

(65) Prior Publication Data
US 2023/0170971 A1    Jun. 1, 2023

Related U.S. Application Data

(60) Provisional application No. 63/284,764, filed on Dec. 1, 2021.

(51) Int. Cl.
H04B 7/06    (2006.01)
(52) U.S. Cl.
CPC ......... *H04B 7/0695* (2013.01); *H04B 7/0617* (2013.01); *H04B 7/0619* (2013.01)
(58) Field of Classification Search
CPC .. H04B 7/0695; H04B 7/0617; H04B 7/0619; H04B 7/06952
See application file for complete search history.

(56) References Cited

U.S. PATENT DOCUMENTS

| | | | | |
|---|---|---|---|---|
| 11,743,163 B2* | 8/2023 | Khojastepour | ...... | H04B 7/0617 375/267 |
| 11,743,744 B2* | 8/2023 | Khojastepour | ......... | H04L 43/12 370/252 |
| 11,848,851 B2* | 12/2023 | Khojastepour | ..... | H04W 72/046 |
| 2015/0244432 A1* | 8/2015 | Wang | ................... | H04B 7/0417 375/267 |
| 2016/0286563 A1* | 9/2016 | Shirakata | ............... | H04B 7/088 |

OTHER PUBLICATIONS

Khojastepour, M. A. A., Shahsavari, S., Khalili, A., & Erkip, E. (Nov. 1, 2020). Multi-user beam alignment for millimeter wave systems in multi-path environments. In 2020 54th Asilomar Conference on Signals, Systems, and Computers (pp. 549-553). IEEE.
S. A. Busari, S. Mumtaz, S. Al-Rubaye, and J. Rodriguez, (Jun. 18, 2018) "5g millimeterwave mobile broadband: Performance and challenges," IEEE Communications Magazine, vol. 56, No. 6, pp. 137-143.

(Continued)

*Primary Examiner* — David S Huang
(74) *Attorney, Agent, or Firm* — Joseph Kolodka

(57) ABSTRACT

A method for transmitting data is provided. The method includes sending a probing packet using a scanning beam selected from a set of probing beams. The method further includes receiving feedback about the probing packet. The method also includes determining a data transmission beam based on the set of probing beams and the received feedback. The method additionally includes transmitting data using a multi-element antenna that is configured according to the determined data transmission beam.

16 Claims, 8 Drawing Sheets

(56) References Cited

OTHER PUBLICATIONS

S. Kutty and D. Sen, (Dec. 1, 2016) "Beamforming for millimeter wave communications:An inclusive survey," IEEE Communications Surveys Tutorials, vol. 18, No. 2, pp. 949-973.

M. R. Akdeniz, Y. Liu, M. K. Samimi, S. Sun, S. Rangan, T. S. Rappaport, and E. Erkip, (Jun. 13, 2014) "Millimeter wave channel modeling and cellular capacity evaluation," IEEE Journal on Selected Areas in Communications, vol. 32, No. 6, pp. 1164-1179.

T. Nitsche, A. B. Flores, E. W. Knightly, and J. Widmer, (Apr. 26, 2015) "Steering with eyes closed: Mm-wave beam steering without in-band measurement," in 2015 IEEE Conference on Computer Communications (INFOCOM), pp. 2416-2424.

S. Shahsavari, M. A. Amir Khojastepour, and E. Erkip, (Jun. 3, 2019) "Robust beam tracking and data communication in millimeter wave mobile networks," in 2019 International Symposium on Modeling and Optimization in Mobile, Ad Hoc, and Wireless Networks (WiOPT), pp. 1-8.

C. N. Barati, S. A. Hosseini, M. Mezzavilla, T. Korakis, S. S. Panwar, S. Rangan, and M. Zorzi, (Sep. 14, 2016) "Initial access in millimeter wave cellular systems," IEEE Transactions on Wireless Communications, vol. 15, No. 12, pp. 7926-7940.

M. Giordani, M. Mezzavilla, C. N. Barati, S. Rangan, and M. Zorzi, (Mar. 16, 2016) "Comparative analysis of initial access techniques in 5g mmwave cellular networks," in 2016 Annual Conference on Information Science and Systems (CISS), pp. 268-273.

V. Desai, L. Krzymien, P. Sartori, W. Xiao, A. Soong, and A. Alkhateeb, (Nov. 2, 2014) "Initial beamforming for mmwave communications," in 2014 48th Asilomar Conference on Signals, Systems and Computers, pp. 1926-1930.

M. Hussain and N. Michelusi, (Feb. 12, 2017) "Throughput optimal beam alignment in millimeter wave networks," in 2017 Information Theory and Applications Workshop (ITA), pp. 1-6.

S. Noh, M. D. Zoltowski, and D. J. Love, (Jun. 13, 2017) "Multi-resolution codebook and adaptive beamforming sequence design for millimeter wave beam alignment," IEEE Transactions on Wireless Communications, vol. 16,No. 9. pp. 5689-5701.

A. Khalili, S. Shahsavari, M. A. Amir Khojastepour, and E. Erkip, (Jun. 21, 2020,) "On optimal multi-user beam alignment in millimeter wave wireless systems," in 2020 IEEE International Symposium on Information Theory (ISIT), pp. 2953-2958.

\* cited by examiner

Use a composite beam for the data transmission beam. The composite beam covers a plurality of disjoint angular intervals. ~340A Maintain a transmitted power outside respective angular intervals from among the plurality of disjoint angular intervals to be negligible with respect to a transmitted power inside the respective angular intervals. In an embodiment, a number of disjoint intervals of the composite beam in a set of composite beams used for a data transmission is less than a threshold. In an embodiment, the threshold is a function of a number of antennas used for the data transmission. ~340B Design the composite beam based on splitting a transmission packet into plurality of streams and using a different data transmission beam for each of the plurality of streams. ~340C

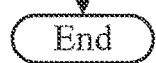

FIG. 5

Algorithm 2: Modify-Sol
Input: $G_N, \bar{\lambda}, \mathbb{C}_{eff}, s = True, count = 0$ 1: $dir = \{forward, backward\}, \bar{\lambda}_{old} = \bar{\lambda}$
2: $perm = \text{Shuffle } \{(p,q,r) | p, q \in [2b], r \in dir, p \leq q\}$
3: repeat
4:     Orderly select next tuple $(p, q, r)$ from $perm$
5:     Slide $\{z_i\}_{i=p}^{q}$ in $r \in dir$ direction on points in $G_N$
6:     Compute $\bar{\lambda}_{new}$ from (11) using $f_\psi(\psi)$ and $\mathbb{C}_{eff}$
7:     if $\bar{\lambda}_{new} \geq \bar{\lambda}_{old}$ then
8:         $count ++$
9:     end if
10: until $(count = 2b^2 + b) \vee (\bar{\lambda}_{new} < \bar{\lambda}_{old})$
11: if $count = 2b^2 + b$ then
12:     Return $(True, \bar{\lambda}_{new}, \mathbb{C}_{eff})$
13: else
14:     Return modify-sol $(G_N, \bar{\lambda}_{new}, \mathbb{C}_{eff})$
15: end if

FIG. 8

MULTI-USER BEAM ALIGNMENT IN PRESENCE OF MULTI-PATH

RELATED APPLICATION INFORMATION

This application claims priority to U.S. Provisional Patent Application No. 63/284,764, filed on Dec. 1, 2021, incorporated herein by reference in its entirety.

BACKGROUND

Technical Field

The present invention relates to cellular communication and more particularly to multi-user beam alignment in the presence of multi-path.

Description of the Related Art

To overcome the high path-loss and the intense shadowing in millimeter-wave (mmWave) communications, effective beamforming schemes are required which incorporate narrow beams with high beamforming gains. The mmWave channel on the other hand, consists of a few spatial clusters each associated with an angle of departure (AoD). The narrow beams must be aligned with the channel AoDs to increase the beamforming gain. This is achieved through a procedure called beam alignment (BA). Most of the BA schemes in the literature make the assumption of a single active user. However, an effective BA scheme for realistic scenarios must be able to collectively handle multiple active users.

SUMMARY

According to aspects of the present invention, a method for transmitting data is provided. The method includes sending a probing packet using a scanning beam selected from a set of probing beams. The method further includes receiving feedback about the probing packet. The method also includes determining a data transmission beam based on the set of probing beams and the received feedback. The method additionally includes transmitting data using a multi-element antenna that is configured according to the determined data transmission beam.

According to other aspects of the present invention, a base station is provided. The base station includes a multi-element antenna. The base station further includes a memory device for storing program code. The base station also includes a processor device operatively coupled to the memory device for running the program code to send a probing packet using a scanning beam selected from a set of probing beams. The processor device further runs the program code to receive feedback about the probing packet. The processor device also runs the program code to determine a data transmission beam based on the set of probing beams and the received feedback. The processor device additionally runs the program code to transmit data using the multi-element antenna that is configured according to the determined data transmission beam.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIGS. 3-5 are flow diagram showing an exemplary method for multi-user beam alignment in the presence of multi-path, in accordance with an embodiment of the present invention;

FIG. 8 is a diagram showing another exemplary algorithm pseudocode, in accordance with an embodiment of the present invention.

DETAILED DESCRIPTION OF PREFERRED EMBODIMENTS

Embodiments of the present invention are directed to multi-user beam alignment in the presence of multi-path.

Embodiments of the present invention propose a class of efficient Beam Alignment (BA) schemes that operate in the non-interactive mode, i.e., the receiver feedback is not available to the transmitter unless after the end of the scanning phase. Embodiments of the present invention use scanning beams that follow a special form, namely, Tulip Design in the BA procedure. To yield narrower beams, an objective is to minimize the uncertainty region of where the AoDs may lie. In other words, it is intended to minimize the expected value of the average transmission beamwidth resulting from the BA scheme. Embodiments of the present invention present multiple policies for the BA procedure that correspond to how the notion of the uncertainty region is defined. Embodiments of the present invention propose a greedy algorithm to solve the BA optimization problem for various policies.

Figure 1:
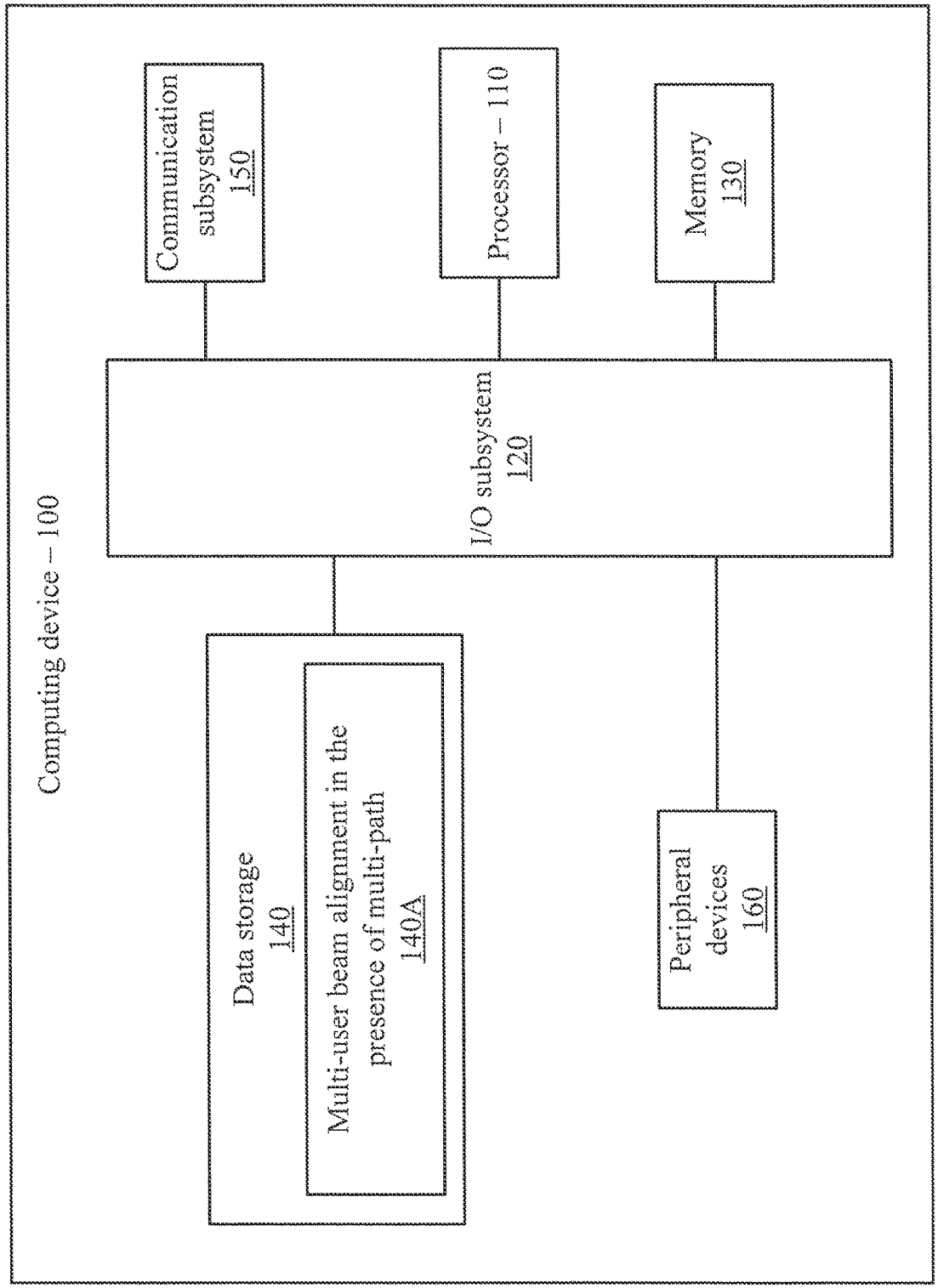
FIG. 1 is a block diagram showing an exemplary computing device, in accordance with an embodiment of the present invention.

FIG. 1 is a block diagram showing an exemplary computing device 100, in accordance with an embodiment of the present invention. Computing device 100 can be base station 230 in FIG. 2, in accordance with one embodiment. The computing device 100 is configured to perform multi-user beam alignment in the presence of multi-path.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for multi-user beam alignment in the presence of multi-path. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
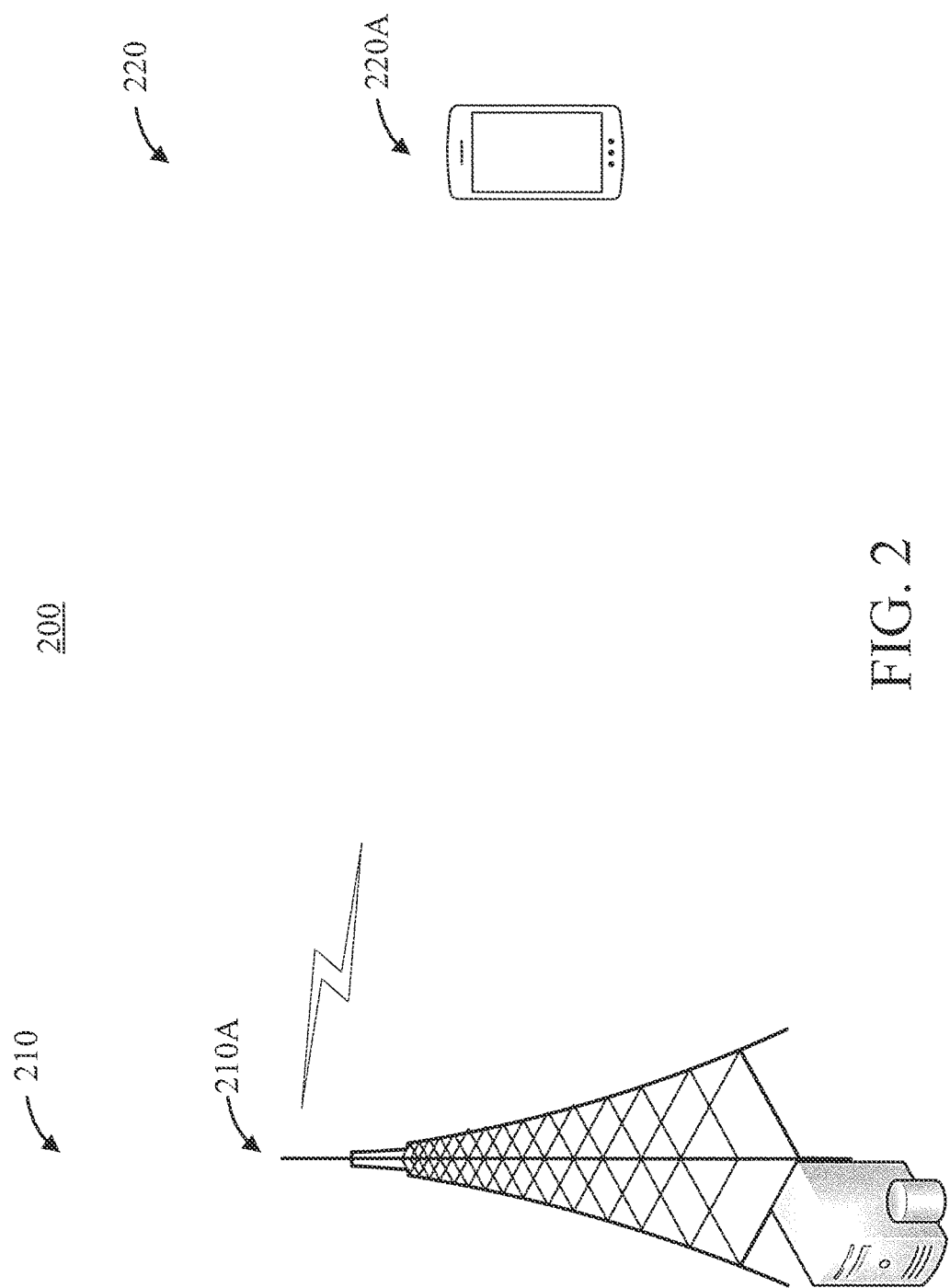
FIG. 2 shows an exemplary environment to which the present invention can be applied, in accordance with an embodiment of the present invention.

These and other variations of a hardware processor subsystem are also contemplated in accordance with embodiments of the present invention FIG. 2 shows an exemplary environment 200 to which the present invention can be applied, in accordance with an embodiment of the present invention.

The environment includes a base station side including a base station 210A and user equipment side 220 including user equipment 220A (e.g., mobile smart phones).

The base station 210A transmits data to the user equipment 220A uses the inventive principles described herein.

A description will now be given regarding notations, in accordance with an embodiment of the present invention.

Herein, "\" denotes the set minus operation, [b] denotes the set of all integers greater than or equal to zero and less than $b \cdot \ominus$ and $ respectively denote the summation and subtraction operations in the base $b \cdot | \cdot |$ may denote the cardinality if applied to a set or the Lebesgue measure if applied to an interval.

Figure 3:
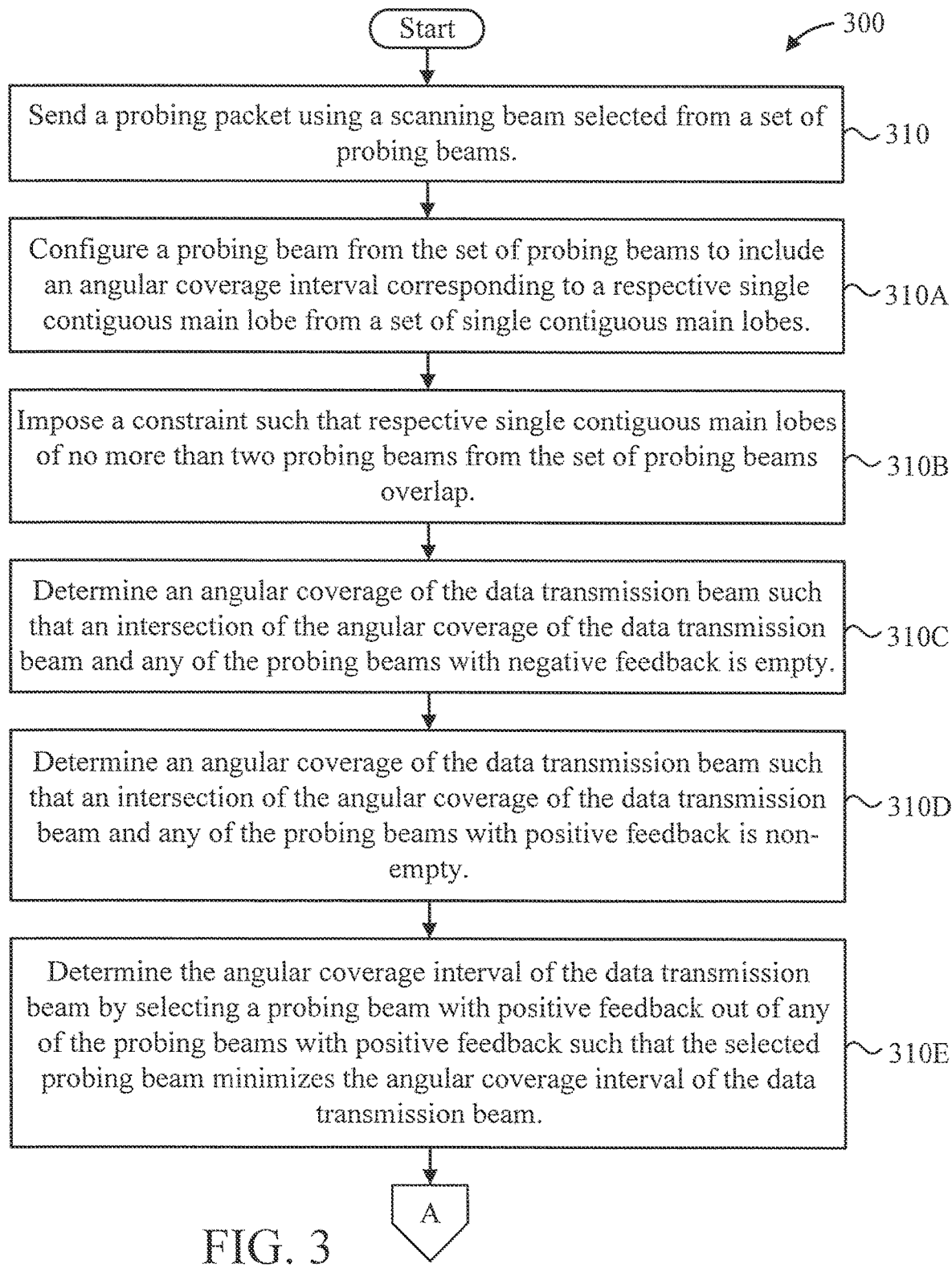
Figure 4:
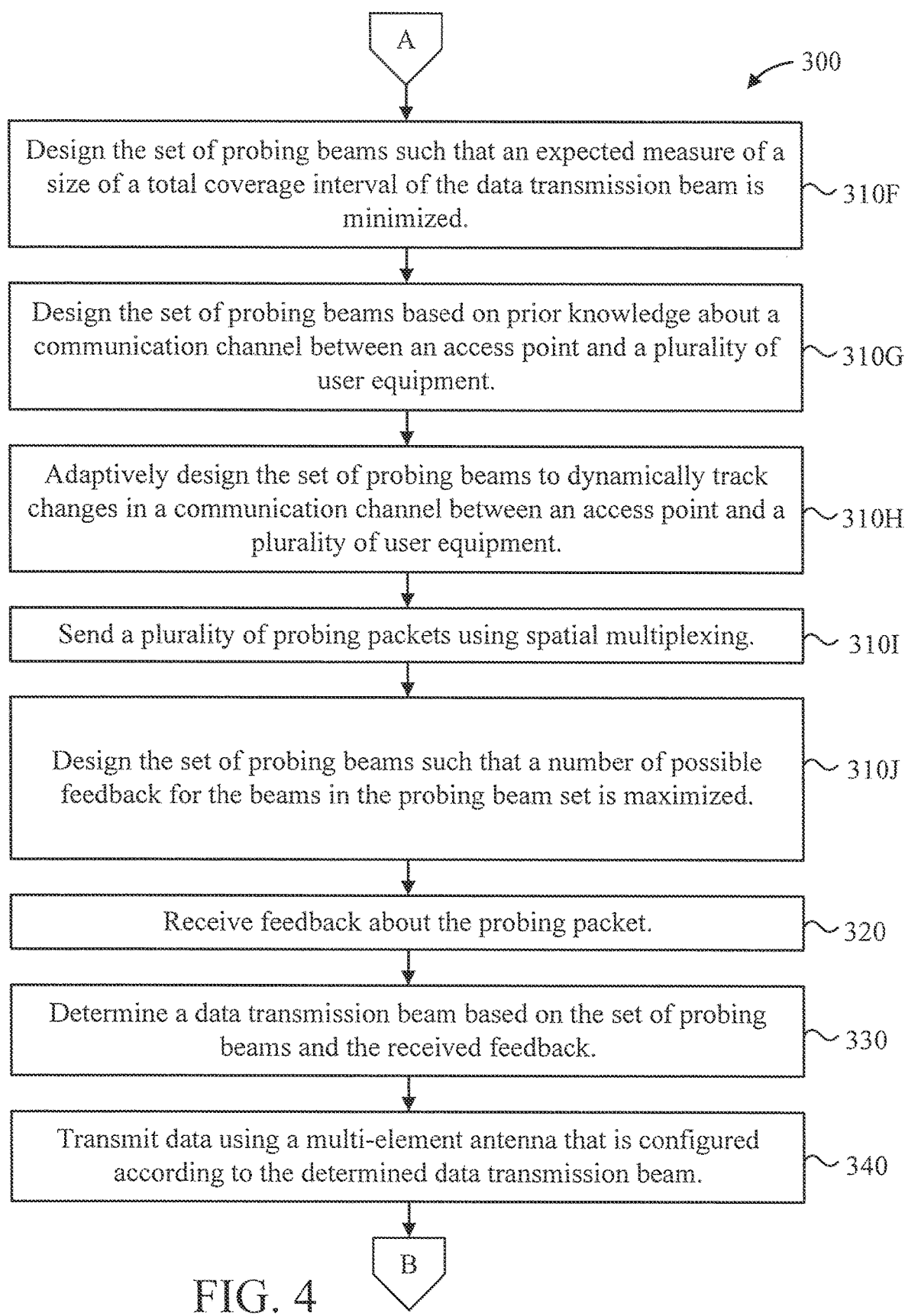

FIGS. 3-5 are flow diagram showing an exemplary method for multi-user beam alignment in the presence of multi-path, in accordance with an embodiment of the present invention.

At block 310, send a probing packet using a scanning beam selected from a set of probing beams.

In an embodiment, block 310 can include one or more of blocks 310A through 310J.

At block 310A, configure a probing beam from the set of probing beams to include an angular coverage interval corresponding to a respective single contiguous main lobe from a set of single contiguous main lobes.

At block 310B, impose a constraint such that respective single contiguous main lobes of no more than two probing beams from the set of probing beams overlap.

At block 310C, determine an angular coverage of the data transmission beam such that an intersection of the angular coverage of the data transmission beam and any of the probing beams with negative feedback is empty.

At block 310D, determine an angular coverage of the data transmission beam such that an intersection of the angular coverage of the data transmission beam and any of the probing beams with positive feedback is non-empty.

At block 310E, determine the angular coverage interval of the data transmission beam by selecting a probing beam with positive feedback out of any of the probing beams with positive feedback such that the selected probing beam minimizes the angular coverage interval of the data transmission beam.

At block 310F, design the set of probing beams such that an expected measure of a size of a total coverage interval of the data transmission beam is minimized.

At block 310G, design the set of probing beams based on prior knowledge about a communication channel between an access point and a plurality of user equipment.

At block 310H, adaptively design the set of probing beams to dynamically track changes in a communication channel between an access point and a plurality of user equipment.

At block 310I, send a plurality of probing packets using spatial multiplexing.

At block 310J, design the set of probing beams such that a number of possible feedback for the beams in the probing beam set is maximized.

At block 320, receive feedback about the probing packet.

At block 330, determine a data transmission beam based on the set of probing beams and the received feedback.

At block 340, transmit data using a multi-element antenna that is configured according to the determined data transmission beam.

In an embodiment, block 340 can include one or more of blocks 340A through 340D.

At block 340A, use a composite beam for the data transmission beam. The composite beam covers a plurality of disjoint angular intervals.

At block 340B, maintain a transmitted power outside respective angular intervals from among the plurality of disjoint angular intervals to be negligible with respect to a transmitted power inside the respective angular intervals. In an embodiment, a number of disjoint intervals of the composite beam in a set of composite beams used for a data transmission is less than a threshold. In an embodiment, the threshold is a function of a number of antennas used for the data transmission.

At block 340C, design the composite beam based on splitting a transmission packet into plurality of streams and using a different data transmission beam for each of the plurality of streams.

A description will now be given regarding a system model, in accordance with an embodiment of the present invention.

Consider a mmWave communications scenario with a single base station (BS) and an arbitrary number of mobile users (MUs), say N, where prior knowledge on the value of N may or may not be available at the BS. The BA procedure aims at obtaining the accurate AoDs corresponding to the downlink mmWave channel from the BS to the users. Under the BA procedure, the BS transmits probing packets in different directions via various scanning beams (SBs) and receives feedback from all the users, based on which the BS computes a transmission beam (TB) for each user.

A description will now be given regarding a channel model, in accordance with an embodiment of the present invention.

Unlike in the prior art, embodiments of the present invention consider multipath in the transmission from the BS to the MUs. More precisely, it is presumed the mmWave channel from the BS to each MU includes a maximum of p resolvable paths where each resolvable path corresponds to a possible AoD of the channel. Let $\Psi_j = \{\Psi_{ij}\}_{i=1}^{p}$ denote the random AoD vector corresponding to the channel between the BS and the $j^{th}$ MU, where $\Psi_{ij}$ represents the AoD of the $i^{th}$ path. Denote by $f_{\Psi_j}(\psi_{1j}, \ldots, \psi_{pj})$, defined over $\mathbb{D} \subset (0, 2\pi]^p$, the probability density function (PDF) of $\Psi_j$. The PDF $f_{\Psi_j}(\bullet)$ encapsulates the knowledge about the AoD of the $j^{th}$ user prior to the BA procedure, or may act as a priority function over the angular search domain. Such information may be inferred from previous beam tracking, training, or alignment trials. A uniform distribution is tantamount to the lack of any prior knowledge or priority over the search domain.

A description will now be given regarding a beamforming model, in accordance with an embodiment of the present invention.

Embodiments of the present invention consider a multi-antenna base station with an antenna array of large size realizing beams of high resolution. For power efficiency, embodiments of the present invention assume hybrid beamforming techniques are in effect in the BS deploying only a few RF chains. Further, embodiments of the present invention adopt a sectored antenna model where each beam is modeled by the constant gain of its main lobe, and the angular coverage interval (ACI) it covers.

A description will now be given regarding a time-slotted system model, in accordance with an embodiment of the present invention.

Figure 6:
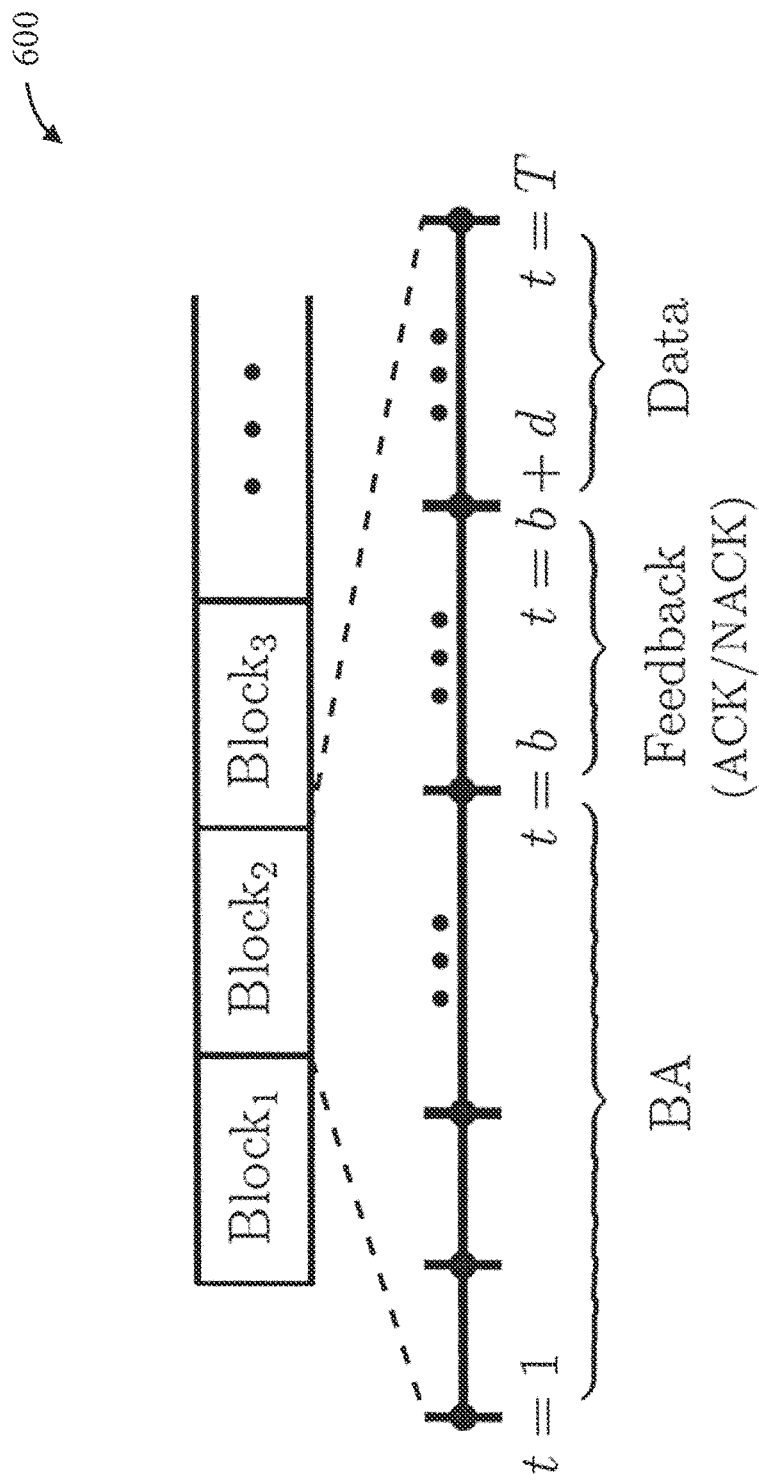
FIG. 6 is a diagram showing an exemplary time-slotted system model, in accordance with an embodiment of the present invention.

FIG. 6 is a block diagram showing a time-slotted system model 600, in accordance with an embodiment of the present invention. Embodiments of the present invention consider a system operating under the time division duplex (TDD) and the NI-BA schemes, with frames of length T. Each frame consists of T equal slots. In each frame, the first b slots are dedicated to the transmission of the probing packets, denoted by scanning time-slots (STS) and the next d slots denoted by feedback time-slots (FTS) are allocated to receiving the users feedback that may arrive through a side channel or according to any random access mode. Finally, the last T+b+d slots are reserved for data transmission, namely data transmission time-slots (DTS).

A description will now be given regarding a beam alignment model, in accordance with an embodiment of the present invention.

The objective of the BA scheme is to generate narrowest possible TBs for the data transmission phase for each user to produce beams of higher gain and quality. In other words, utilizing the feedbacks provided by the users in the FTS to the SBs transmitted by the BS in the STS, the BS aims at localizing the AoD of each user to minimize the uncertainty region (UR) for each AoD. Let $\mathbb{B} = \{\Phi_i\}_{i=1}^{b}$ be the set of STS scanning beams where $\Phi_i$ denotes the ACI of the SB sent over time-slot $i \in [b]$. The feedback provided by each user to each SB is binary. If the AoD corresponding to at least one of the resolvable paths in the channel from the BS to the MU is within the ACI of the SB, then the MU will receive the probing packet sent via that SB and feeds back an acknowledgment (ACK). Otherwise, the feedback of the MU will be considered as a negative acknowledgment (NACK) indicating none of the user AoD's lie in the ACI of the SB. Once the FTS ends, the BS will determine the TBs using the SBs and the feedback sequences provided by the users according to the BA policy. The BA policy is formally defined as a function from the set of feedback sequences to the set of TBs.

A description will now be given regarding the problem formulation, in accordance with an embodiment of the present invention.

A description will now be given regarding preliminaries, in turn, regarding the problem formulation, in accordance with an embodiment of the present invention.

The BA policy determines how the direction of the TBs is computed. This decision naturally considers the UR of the AoDs of each user channel. Herein, four different policies are considered that differ based on how they define the URs of the AoDs and whether they require the exact number of spatial clusters or not.

A description will now be given regarding general policies, in accordance with an embodiment of the present invention.

We define two general policies that do not require any information regarding the number of spatial clusters, namely (i) spatial diversity (SD) policy and (ii) beamforming (BF) policy. The SD policy aims at generating TBs with minimal angular span that cover all the angular intervals that may contain a resolvable path, while the promise of the BF policy is to generate TBs that cover at least one resolvable path but further reduce the angular span of the TBs. The advantage of the SD policy to the BF policy is its resilience against the potential failure or blockage of one or some of the spatial clusters as long as at least one resolvable path remains, while the BF policy has the advantage of producing much higher beamforming gains compared to that of the SD policy but it is vulnerable to path blockage. This will introduce an interesting trade-off between connectivity maintenance and high beamforming gain.

A description will now be given regarding path-based policies, in accordance with an embodiment of the present invention.

If the exact number of spatial clusters, p, is known, each of the above policies may be improved by further lowering the span of the resultant TBs. The corresponding two new policies are denoted by p-SD policy and p-BF policy, respectively.

In the following, we state the expressions for the URs corresponding to each of the mentioned SD and BF policies.

Let $B_\mathbb{P}^j(\mathbb{B}, s)$ denote the UR of the $j^{th}$ user providing the feedback sequence s under the policy $\mathbb{P} \in \{SD, BF, -SD, \text{and} the SB set $\mathbb{B}$. For instance, $B_{SD}^j(\mathbb{B}, s)$ is the minimal angular span that covers all the resolvable paths for the $j^{th}$ user. Similarly, $B_{BF}^j(\mathbb{B}, s)$ is the minimal angular span that covers at least one resolvable path for the $j^{th}$ user. Further, let the positivity set $A^j(s) \subseteq [b]$ be the set of all indices corresponding to the SBs that are acknowledged by the $j^{th}$ user. Define the negativity set $N^j(s) \subseteq [b]$ in a similar fashion for the not acknowledged SBs. To facilitate the statement of the URs and the subsequent following discussions we define the notion of the component beam (CB). The CB $\omega_A$ is defined as follows:

$$\omega_A = \cap_{i \in A} \Phi_i / \cup_{A \subset T \in [b], A \neq T} \cap_{i \in T} \Phi_i \quad (1)$$

It is straightforward to show that $\omega_A \cap \omega_T = \emptyset$ for any $A \neq T$, and $\Phi_i = \cup_{A, i \in A} \omega_A$ for all $i \in [b]$. We define the CB set as $\mathbb{C} = \{\omega_A, \omega_A \neq \emptyset, A \subseteq [b]\}$. Obviously, $\mathbb{B}$ can be generated form $\mathbb{C}$ and vice versa.

Note that if the $j^{th}$ user sends an ACK in response to the SB $\Phi_i$, this would mean that $\Theta_j(s) \approx \Phi_i$ has at least one resolvable path. On the other hand, a NACK would mean that no resolvable paths reside in $\Phi_i$ and therefore, any resolvable path should exist in $\Theta_j(s) \approx \mathbb{D} - \Phi_i$, and $B_\mathbb{P}^j(\mathbb{B}, s) \in \mathbb{D} - \Phi_i$ for the above-mentioned policies. Having this in mind, we can explicitly express the uncertainty region for the general policies as follows.

$$B_{SD}^j(s) = (\cup_{i \in A(s)} \Theta_i(s)) \cap (\cap_{i \in N(s)} \Theta_i(s)) \quad (2)$$

$$B_{BF}^j(s) = \Theta_K(s) \cap (\cap_{i \in N(s)} \Theta_i(s)) \quad (3)$$

where $k = \arg\min_{l \in A(s)} |\Theta_l(s) \cap (\cap_{i \in N(s)} \Theta_i(s))|$. For the path-based policies, having the luxury of the knowledge on the exact value of p, we can improve the SD and the BF policies to p −SD and p −BF, respectively. For the simplicity of presentation, we only express the improved policies for p=2.

We define $\mathbb{W}_A = \{\{C, C'\} \text{ s.t. } \omega_C, \omega_{C'} \in \mathbb{C}, C \cup C' = A\}$, $\mathbb{V}_A = \cup_{V \in \mathbb{W}_A} V$ and $n = |\mathbb{W}_A|$. Let $\otimes \mathbb{W}_A$ denote the Cartesian product of all elements of $\mathbb{W}_A$ where each element of $\otimes \mathbb{W}_A$ is a n-tuple. For a n-tuple $T = (t_1, t_2, \ldots, t_n)$, we define union $(T) = \cup_{i=1}^n t_i$. We have $$B_{2-SD}^j(s) = \bigcup_{V \in \mathbb{V}_A} \omega_V \quad (4)$$

$$B_{2-BF}^j(s) = \text{UNION}(T^*), T^* = \arg\min_{T \in \otimes \mathbb{W}_A} |\text{UNION}(T)| \quad (5)$$

Note that for the special case of p=1 all the mentioned policies collapse into one. Next, we will present the BA problem formulation.

A description will now be given regarding a problem formulation, in accordance with an embodiment of the present invention.

Problem Formulation

We assume there are N users that are prioritized according to the weight vector $$\{c_j \geq 0\}_{j=1}^N, \sum_{j=1}^N c_j = 1. \text{ Let } \mathbb{U} = \{u_k\}_{k=1}^M$$

denote the range of the policy function $B_\mathbb{P}^j(\mathbb{B}, s)$. In other words, the TBs resulting from the BA scheme may take any value in the set $\mathbb{U}$. The expected value of the average beamwidth resulted from the BA scheme for policy $\mathbb{P}$ is $$\overline{U}_\mathbb{P}(\mathbb{B}) = \sum_{j=1}^N c_j \mathcal{E}[|B_\mathbb{P}(s)|], \text{ where} \quad (6)$$

$$\mathcal{E}[|B_\mathbb{P}(s)|] = \sum_{k=1}^M |u_k| \wp\{B_\mathbb{P}(s) = u_k\} \quad (7)$$

and $|u_k|$ denotes the Lebesgue measure of the $u_k$. Note that $u_k$ may be a finite union of multiple intervals in which case $|u_k|$ will be the sum of their widths. Given the value of b the objective of the BA scheme is to design $\{\Phi_i\}_{i=1}^b$ such that the expected average TB beamwidths as in (6) gets minimized. i.e., $$\{\Phi_i^*\}_{i=1}^b = \mathrm{argmin}^-_{\{\Phi_i\}_{i=1}^b} U_{\mathbb{P}}(\{\Phi_i\}_{i=1}^b) \qquad (8)$$

As shown in Equation (7), it is straightforward to establish that a multi-user NI-BA problem can be posed as single-user NI-BA by casting the weighted average of the users' PDFs as a prior on the AoD of a single user.

$$f_{\Psi}(\psi) = \sum_{j=1}^N c_j f_{\Psi_j}(\psi), \psi \in \mathbb{D} \qquad (9)$$

Therefore, we solve the problem for the single-user case with the PDF as in Equation (9) and remove the index j from the notations.

Let $P_A$ be the probability of receiving a binary feedback sequence with the positivity set A. Using the inclusion-exclusion principle we can express $P_A$ as follows, $$P_A = (\Sigma_{C \subset A} g(\omega_C))^p - \Sigma_{B \subset A^{(L-1)}} (\Sigma_{C \in B} g(\omega_C))^p + \Sigma_{B \subset A^{(L-2)}}$$
$$(\Sigma_{C \subset B} g(\omega_C))^p - \ldots + (-1)^{(L+1)} \Sigma_{B \subset A^{(1)}} (\Sigma_{C \in B} g(\omega_C))^p \qquad (10)$$

where $g(\omega_C) = \int_{\psi \in \omega_C} f_{\Psi}(\psi) d\psi$, and $A^{(l)}$, $l \in [L]$ is the set of all subsets of A with size l. Further, let $\lambda_{\mathbb{P}}(A)$ be the width of the TB resulted from the feedback sequence s with the positivity set A. The objective function (6) can be rewritten as, $$\bar{\lambda} = \Sigma_{A \in [b]} \lambda_{\mathbb{P}}(A) P_A \qquad (11)$$

where $\lambda_{\mathbb{P}}(A)$ for mentioned policies is expressed as, $$\lambda_{SD}(A) = \sum_{C \subset A} \lambda(\omega_C) \qquad (12)$$

$$\lambda_{BF}(A) = \min_{i \in A} \sum_{C, i \in C, C \subset A} \lambda(w_c) \qquad (13)$$

$$\lambda_{2\text{-}SD}(A) = \sum_{V \in \mathcal{V}_A} \lambda(\omega_V) \qquad (14)$$

$$\lambda_{2\text{-}BF}(A) = \sum_{i=1}^n \lambda(\omega_{t_i}), \text{ where } T^* = (t_1, \ldots t_n) \qquad (15)$$

The optimized scanning beam set $\mathbb{B}^*$ is obtained from $\mathbb{C}^*$ where $$C^* = \mathrm{argmin}_C \bar{\lambda} \qquad (16)$$

A description will now be given regarding a proposed beam alignment scheme, in accordance with an embodiment of the present invention.

A set of SB is called generalized exhaustive search (GES) if and only if for any i and j, $\Phi_i \cap \Phi_j = \emptyset$. A set of SB is called exhaustive search (ES) if and only if it is GES and $\lambda(\omega_i) = \lambda(\omega_j)$. A contiguous beam is denoted by its angular coverage interval (ACI), e.g., the beam $\Phi_i$ is denoted as $[s_i, e_i)$. A composite beam is defined as a beam with multiple disjoint ACIs. As the number of ACIs increases, the sharpness of the beams deteriorates. For the scanning beams it is desirable to use the sharpest beams, hence, we use contiguous beams (beam with single ACIs) as scanning beams. It is not hard to show that b scanning beams generates at most 2b CBs due to possible intersection of multiple scanning beams. Out of possible set of scanning beams, some are more appropriate. Since, the policy is a function from the set of feedback sequences, it is desirable to maximize the size of the set of feedback sequences. Hence, we first pose the following question: "What is the most distinguishable set of scanning beams, i.e., the set of beams which can generate the maximum number of possible feedback sequences?"

To answer this question, we define a special form for the set of scanning beams, namely, Tulip design for which we have proved it generates the maximum number of feedback sequences for p=1 and p=2. While we strongly believe that the same is true for p≥3, we do not have a formal proof. Hence, any results that is presented in the evaluation section for p≥3 is merely the results obtained under the assumption of using Tulip design.

Definition 1 Tulip design is given by a set of contiguous SBs $\mathbb{B} = \{\Phi_i\}$, $i \in [b]$ where each beam may only have intersection with its adjacent beams with the exception of $\Phi_1$ and $\Phi_b$ for which the intersection might be nonempty. This means $\Phi_i \cap \Phi_j = \emptyset$, $1 < |i-j| < b-1$.

Theorem 2 Among the set of contiguous scanning beams, a set of scanning beams with Tulip design generates the maximal number of possible feedback sequences for the channel with p=1 and 2, for an arbitrary distribution of channel AoD that is nonzero on any points in the range $[0, 2\pi)$.

Figure 7:
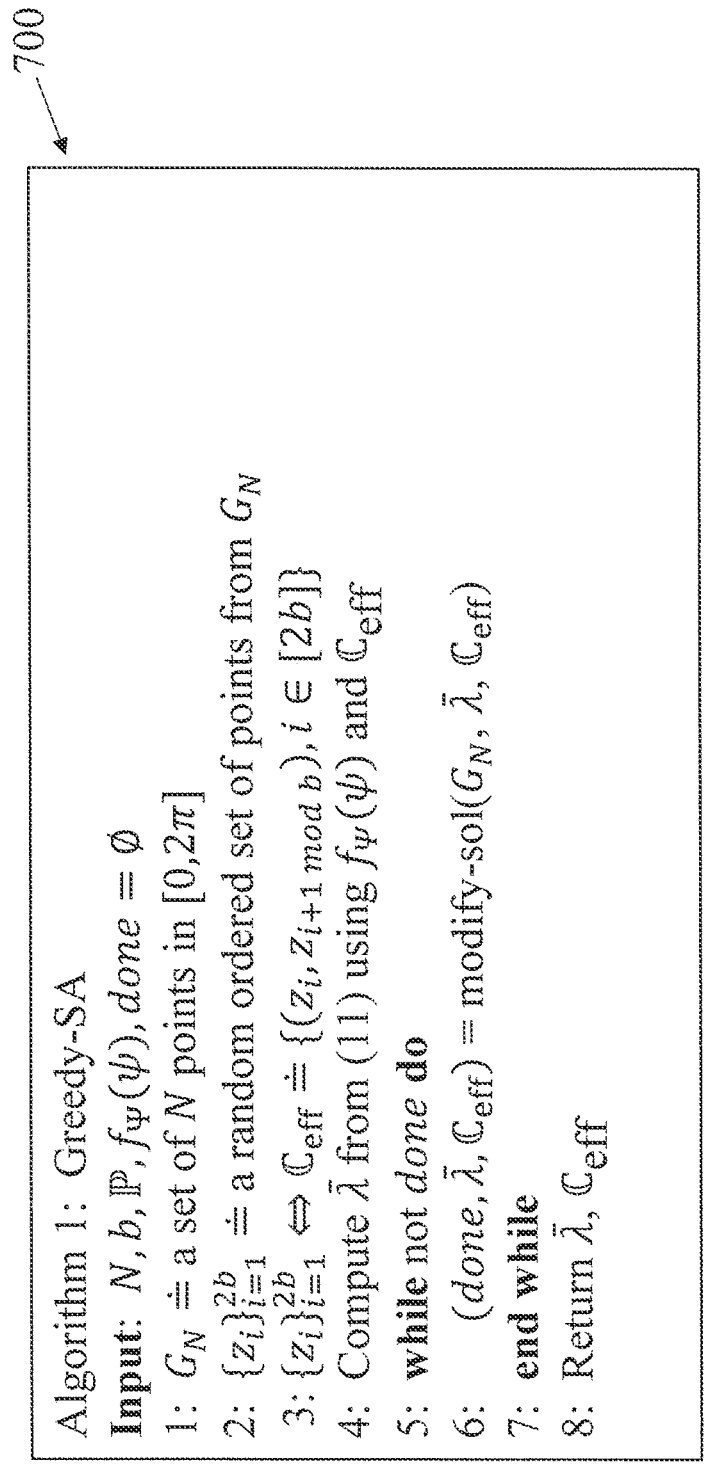
FIG. 7 is a diagram showing exemplary algorithm pseudocode, in accordance with an embodiment of the present invention.

Under the Tulip design, the CB set takes a special form given by $\mathbb{C}_{eff} = \mathbb{C}_{eff}^1 \cup \mathbb{C}_{eff}^2$ where $\mathbb{C}_{eff}^1 = \{\omega_i\}_{i=1}^b$ and $\mathbb{C}_{eff}^2 = \{\omega_{i,i\oplus 1}\}_{i=1}^b$. Clearly, $|\mathbb{C}_{eff}| = 2b$. By using Tulip design, we can reformulate the optimization problem (16) in terms of the starting and ending point of the ACI of the SB $\Phi_i$, i.e., $\Phi_i = x_i, y_i$, $i \in [b]$. Hence, we have $\omega_i = [y_{i\ominus 1}, x_{i\oplus 1})$ and $\omega_{i,i\oplus 1} = [x_i, y_{i\oplus 1})$. We have $$C_{eff}^* = \mathrm{argmin}_{c_{eff}} \bar{\lambda} \qquad (17)$$

$$x_{i+1} \geq x_i, \forall i \in [b-1] \qquad (18)$$

$$y_{i+1} \geq y_i, \forall i \in [b-2] \qquad (19)$$

$$x_{i+2} \geq y_i \geq x_{i+1}, \forall i \in [b-2] \qquad (20)$$

$$x_1 \leq y_{b-1} \leq 2\pi + x_1 \qquad (21)$$

$$y_b \leq 2\pi + x_2 \qquad (22)$$

$$2\pi + x_1 \leq y_b \qquad (23)$$

where constraints (18)-(23) ensure the validity of the Tulip design. The optimization problem (17) is generally nonlinear. For instance, for uniform distribution on the AoD of the user, the objective function (17) is a polynomial function of the order (p+1) of the beamwidth of the CBs. We propose a greedy algorithm 700 to solve the BA optimization problem that is pseudo-coded as follows in Algorithm 1, as shown in FIG. 7. The Greedy-SA algorithm starts by discretizing the angular domain $\mathbb{D} = [0, 2\pi]$ to get the ground set $G_N$, the quantized version of the angular range consisting of N points. It then randomly picks 2b points from the ground set and forms the initial CB set $\mathbb{C}_{eff}$. Hence, the initial value of $\bar{\lambda}$ can be easily computed using (11). The Greedy-SA algorithm 700 makes repeated calls to the Modify-Sol routine 800 pseudo-coded in Algorithm 2, as shown in FIG. 8, to improve the quality of the CB set $\mathbb{C}_{eff}$, i.e., to reduce the value of $\bar{\lambda}$. Each time the Modify-Sol routine 800 is called it performs the following sequence of operations. The routine generates the set perm of all random tuples (p, q, r) where $z_p$ and $z_q$ are two of the points in the set $\{z_i\}_{i=1}^{2b}$ and r denotes a direction in the set {forward, backward}. It then repeatedly picks one such tuple and then slides the window $\{z_i\}_{i=p}^q$ over the ground set $G_N$ in direction r and computes the new value for $\overline{\lambda}$, namely $\overline{\lambda}_{new}$. The first time $\overline{\lambda}_{new}$ goes lower than its old value, the routine records $\overline{\lambda}_{new}$ and the corresponding $\mathbb{C}_{eff}$ and calls itself again with these new values. The Greedy-SA algorithm 700 terminates when all the points $\{z_i\}_{i=1}^{2b}$ are stable. In other words, when there are no tuples (p, q, r)∈perm which improves the value $\overline{\lambda}$ from equation (11) by moving the window $\{z_i\}_{i=p}^q$.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for transmitting data, comprising:
   sending a probing packet using a scanning beam selected from a set of probing beams, wherein a probing beam from the set of probing beam comprises an angular coverage interval corresponding to a respective single contiguous main lobe from a set of single contiguous main lobes;
   receiving feedback about the probing packet;
   determining a data transmission beam based on the set of probing beams and the received feedback, such that an intersection of an angular coverage of the data transmission beam and any of the probing beams with negative feedback is empty; and
   transmitting data using a multi-element antenna that is configured according to the determined data transmission beam.

2. The method of claim 1, wherein an angular coverage of the data transmission beam is determined such that an intersection of the angular coverage of the data transmission beam and any of the probing beams with positive feedback is non-empty.

3. The method of claim 2, wherein the angular coverage interval of the data transmission beam is determined by selecting a probing beam with positive feedback out of any of the probing beams with positive feedback such that the selected probing beam minimizes the angular coverage interval of the data transmission beam.

4. The method of claim 1, wherein a constraint is imposed such that respective single contiguous main lobes of no more than two probing beams from the set of probing beams overlap.

5. The method of claim 1, further comprising using a composite beam for the data transmission beam, wherein the composite beam covers a plurality of disjoint angular intervals.

6. The method of claim 5, wherein a transmitted power outside respective angular intervals from among the plurality of disjoint angular intervals is negligible with respect to a transmitted power inside the respective angular intervals.

7. The method of claim 6, wherein a number of disjoint intervals of the composite beam in a set of composite beams used for a data transmission is less than a threshold.

8. The method of claim 7, wherein the threshold on a number of disjoint intervals of the composite beam is a function of a number of antennas used for the data transmission.

9. The method of claim 5, wherein the composite beam is designed based on splitting a transmission packet into plurality of streams and using a different data transmission beam for each of the plurality of streams.

10. The method of claim 9, further comprising using the composite beam for the probing.

11. The method of claim 1, wherein the set of probing beams is designed such that an expected measure of a size of a total coverage interval of the data transmission beam is minimized.

12. The method of claim 11, wherein the set of probing beams is designed based on prior knowledge about a communication channel between an access point and a plurality of user equipment.

13. The method of claim 11, wherein the set of probing beams is adaptively designed to dynamically track changes in a communication channel between an access point and a plurality of user equipment.

14. The method of claim 1, wherein a plurality of probing packets is sent using spatial multiplexing.

15. The method of claim 1, wherein the set of probing beams is designed such that a number of possible feedback for the beams in the probing beam set is maximized.

16. A base station, comprising:
   a multi-element antenna;
   a memory device for storing program code; and
   a processor device operatively coupled to the memory device for running the program code to:
      send a probing packet using a scanning beam selected from a set of probing beams, wherein a probing beam from the set of probing beams comprises an angular coverage interval corresponding to a respective single contiguous main lobe from a set of single contiguous main lobes;
      receive feedback about the probing packet;
      determine a data transmission beam based on the set of probing beams and the received feedback, such that an intersection of an angular coverage of the data transmission beam and any of the probing beams with negative feedback is empty; and transmit data using the multi-element antenna that is configured according to the determined data transmission beam.

\* \* \* \* \*